(12) United States Patent
Stephenson et al.

(10) Patent No.: US 10,603,725 B2
(45) Date of Patent: Mar. 31, 2020

(54) GROOVER WITH PEENING FLANKS

(71) Applicant: FORD MOTOR COMPANY, Dearborn, MI (US)

(72) Inventors: David Alan Stephenson, Detroit, MI (US); David Garrett Coffman, Warren, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 485 days.

(21) Appl. No.: 15/358,448

(22) Filed: Nov. 22, 2016

(65) Prior Publication Data

US 2018/0141135 A1   May 24, 2018

(51) Int. Cl.
| | |
|---|---|
| *B23C 3/00* | (2006.01) |
| *B23C 5/10* | (2006.01) |
| *B23C 5/20* | (2006.01) |
| *C23C 4/02* | (2006.01) |
| *B23C 3/34* | (2006.01) |
| *F02F 1/00* | (2006.01) |

(52) U.S. Cl.
CPC ............... *B23C 5/109* (2013.01); *B23C 3/00* (2013.01); *B23C 3/34* (2013.01); *B23C 5/207* (2013.01); *C23C 4/02* (2013.01); *B23C 2200/206* (2013.01); *B23C 2210/72* (2013.01); *B23C 2215/242* (2013.01); *B23C 2220/36* (2013.01); *B23C 2222/04* (2013.01); *B23C 2222/52* (2013.01); *B23C 2240/08* (2013.01); *B23C 2240/21* (2013.01); *B23C 2240/24* (2013.01); *B23C 2270/06* (2013.01); *F02F 1/004* (2013.01); *F02F 2200/00* (2013.01)

(58) Field of Classification Search
CPC ........... B23C 5/109; B23C 5/207; B23C 3/34; B23C 2270/06; B23C 2200/206; B23C 2210/72; B23C 2215/242; B23C 2222/52; B23C 2222/04; B23C 2240/08; B23C 2240/21; B23C 2240/24; B23C 2220/36; C23C 4/02; F02F 2200/00; F02F 1/004
See application file for complete search history.

(56) References Cited

U.S. PATENT DOCUMENTS

| | | | | |
|---|---|---|---|---|
| 2,314,902 | A * | 3/1943 | Shepard | C23C 4/02 29/DIG. 39 |
| 2,575,938 | A * | 11/1951 | Brenneke | F02F 7/0046 188/151 R |
| 4,744,278 | A * | 5/1988 | Wright | B23C 5/22 144/218 |
| 6,622,685 | B2 * | 9/2003 | Takahashi | C23C 4/02 123/193.2 |
| 7,121,770 | B1 * | 10/2006 | Gamble | B23C 5/109 407/40 |

(Continued)

*Primary Examiner* — Rick K Chang
(74) *Attorney, Agent, or Firm* — Vincent Mastrogiacomo; Brooks Kushman P.C.

(57) ABSTRACT

According to one aspect of this disclosure, a grooving tool is provided. The grooving tool has a body with a plurality of recesses. Plural inserts assembled into each of the recesses. The recesses include a cutting edge for forming grooves in an engine cylinder wall when rotated in one rotational direction. The insert also includes a peening surface extending in the opposite rotational direction from the cutting edge for deforming the upper edges of the grooves when rotated in an opposite rotational direction.

8 Claims, 7 Drawing Sheets

(56) References Cited

U.S. PATENT DOCUMENTS

| | | | |
|---|---|---|---|
| 7,204,662 B1* | 4/2007 | Long, II | B23C 5/003 |
| | | | 407/103 |
| 7,510,353 B2* | 3/2009 | Kramer | B23C 5/06 |
| | | | 407/113 |
| 8,534,256 B2 | 9/2013 | Whitbeck et al. | |
| 8,726,874 B2 | 5/2014 | Whitbeck et al. | |
| 9,162,418 B2 | 10/2015 | Whitbeck et al. | |
| 10,220,453 B2* | 3/2019 | Stephenson | B23C 5/109 |
| 2002/0037199 A1* | 3/2002 | Satran | B23C 5/1045 |
| | | | 407/54 |
| 2007/0280790 A1* | 12/2007 | Kovac | B23B 27/1662 |
| | | | 407/30 |
| 2008/0244891 A1* | 10/2008 | Iizumi | B23B 27/007 |
| | | | 29/527.4 |
| 2010/0031799 A1* | 2/2010 | Ast | B23B 27/06 |
| | | | 83/875 |
| 2013/0129429 A1* | 5/2013 | Filho | B23C 5/28 |
| | | | 407/11 |
| 2013/0287506 A1* | 10/2013 | Morgulis | B23B 27/065 |
| | | | 407/103 |
| 2014/0360355 A1* | 12/2014 | Whitbeck | B24B 5/08 |
| | | | 92/169.1 |
| 2014/0364042 A1 | 12/2014 | Whitbeck et al. | |
| 2018/0036810 A1* | 2/2018 | Stojanovski | B23C 5/1009 |

\* cited by examiner

GROOVER WITH PEENING FLANKS

TECHNICAL FIELD

This disclosure relates to a tool and process used to form a cylinder within an engine block.

BACKGROUND

Automotive engine blocks include a number of cylindrical engine bores. The inner surface of each engine bore is machined so that the surface is suitable for use in automotive applications, e.g., exhibits suitable wear resistance and strength. The machining process may include roughening the inner surface, applying a metallic coating to the roughened surface and subsequently honing the metallic coating to obtain a finished surface. Surface roughening techniques are known in the art, but have suffered from one or more drawbacks or disadvantages. One previous method required the use of a cutting tool and a swiping tool that required additional tooling cost, incurred processing cost and process steps. This disclosure aims at solving the problems mentioned above.

SUMMARY

According to one aspect of this disclosure, a grooving tool is provided. The grooving tool has a body with a plurality of recesses and a number of inserts are each assembled into one of the recesses. The recesses include a cutting edge for forming grooves in an engine cylinder wall when rotated in one rotational direction. The insert also includes a peening surface extending in the opposite rotational direction from the cutting edge for deforming the upper edges of the grooves when rotated in an opposite rotational direction.

The peening surface has a first straight-line section having a first length extending from and adjacent to the cutting edge. The peening surface has a second straight-line section downwardly extending between the first section and the body.

According to another aspect of this disclosure, the peening surface is a chamfer comprised of three sections. The first section is perpendicular to the cutting edge, the second section is spaced apart from the cutting edge and a third section that connects the first and second sections.

The chamfers of the peening surfaces along the grooving tool may have a nonzero axial helix to reduce tool deflection.

The peening surface may have a coating with a lower coefficient of friction as compared to the coefficient of friction of the cutting edge.

The inserts may be attached to the body by a fastening means.

The fastening means may include a threaded fastener.

The peening surface may have a coating that has a lower coefficient of friction with respect to the coefficient of friction of the cutting edge.

According to another aspect of this disclosure, a method of machining a cylinder wall is disclosed. The method includes cutting a plurality of grooves within a cylinder with a cutting edge to a predetermined diameter by rotating the grooving tool in a first rotational direction and interpolating the grooving tool along a programmed path. The method also includes deforming the grooves with a peening surface of the grooving tool by rotating in a opposite direction and interpolating the tool along a programmed path.

Deforming the grooves may be carried out using multiple peening surfaces of the grooving tool.

The method may include forming flat peaks between adjacent grooves. Deforming the grooves forms an undercut region. Interpolating the tool within the cylinder forms the grooves at a first diameter.

The feed rate to deform the grooves may be at least 0.15 millimeters per revolution.

According to another aspect of this disclosure, a grooving tool is disclosed. The tool includes a body and one or more axial rows of cutting elements that project outwardly from the body. The cutting elements are disposed radially to the circumference of the body. Each cutting element includes a groove cutting element, a pocket cutting element, and a peening surface. The peening surface has a circumferentially convex face disposed between a cutting edge of a cutting element and the body.

The cutting elements may be attached to the body by a brazed bond.

The peening surface and cutting edge may each have an axial length that is approximately equal.

The circumferentially convex face of the peening surface may be offset from the body.

The pocket cutting elements, groove cutting elements and peening surfaces may be tangential to the circumference of the body.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material are to be understood as modified by the word "about" in describing the broadest scope of the present invention. The machining process may include roughening the inner surface and subsequently applying a metallic coating to the roughened surface and subsequently honing the metallic coating to obtain a finished surface. Various surface roughening techniques are known in the art, but have suffered from one or more drawbacks or disadvantages. For instance, the method and tool used are described in application Ser. No. 13/913,865 (US 2014/0360355 A1) and Ser. No. 13/913,871 (US 2014/0364042 A1), requires the use of two or more tools, a cutting tool and a swiping tool. Alternatively, a liner material having requisite strength and wear resistance characteristics may be applied to the unfinished inner surface of the engine bore.

Embodiments disclosed herein provide a grooving tool and processes for roughening the inner surface of cylindrical bores, e.g., engine bores, to enhance adhesion and bonding of a subsequently applied metallic coating, e.g., thermal spray coating onto the inner surface. Accordingly, the finished inner surface may have enhanced strength and wear resistance.

Figure 1A:
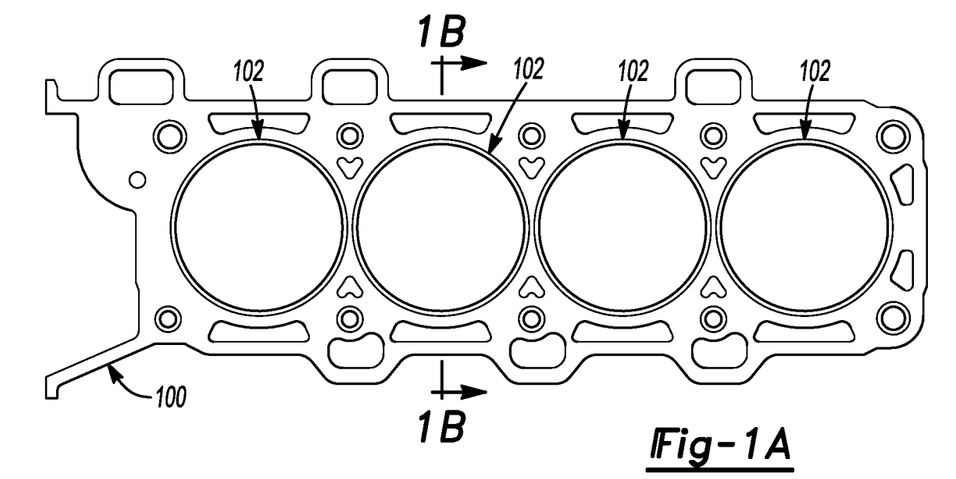
FIG. 1A is a top plan view of one example of an engine block of an internal combustion engine.

Referring to FIG. 1A, a top view of an engine block 100 of an internal combustion engine is illustrated. The engine block 100 includes cylinder bores 102.

Figure 1B:
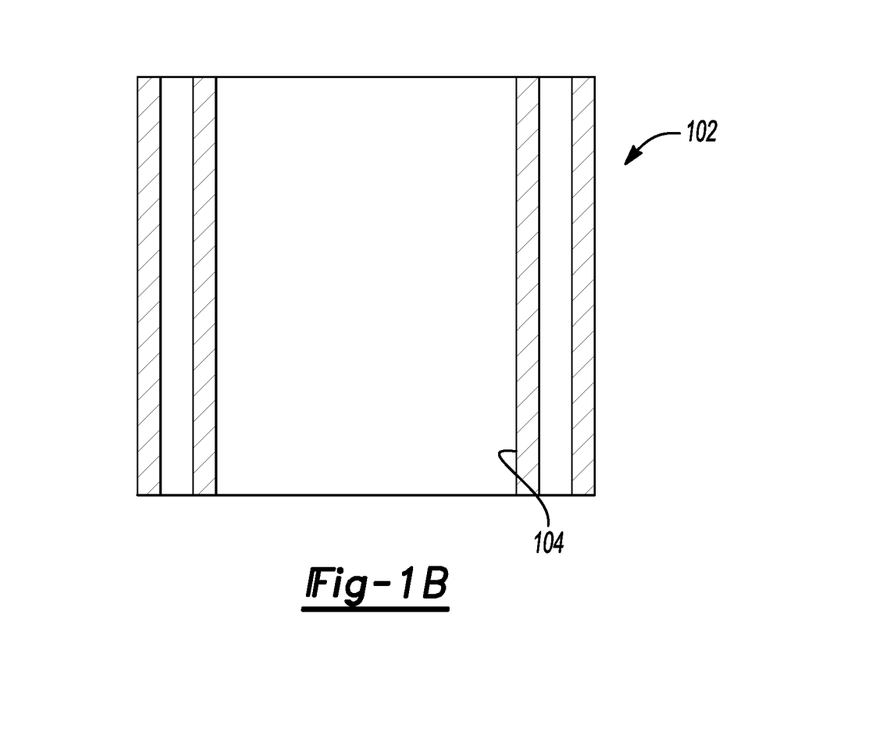
FIG. 1B is an isolated cross-sectional view of a cylinder bore taken along line 1B-1B of FIG. 1A.

Referring to FIG. 1B, an isolated cross-sectional view of cylinder bore 102 taken along line 1B-1B of FIG. 1A is illustrated. Cylinder bore 102 includes an inner surface portion 104. The cylinder bore 102 may be made of metal material, such as aluminum, magnesium, iron, an alloy, steel, or the like. Relatively lightweight aluminum or magnesium alloy materials permits a reduction in engine size and weight, and improve engine power output and fuel economy.

Figure 2A:
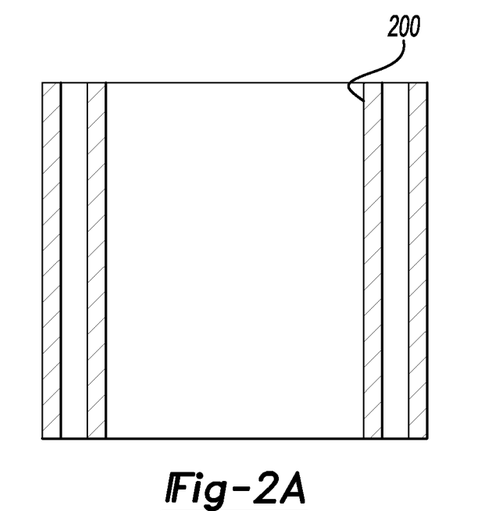
FIG. 2A illustrates a pre-boring step in which an unprocessed cylinder bore inner surface is bored to a diameter.

Referring to FIGS. 2A-2E, cross-sectional views of the inner surface within the cylinder bore are illustrated. The figures relate to steps of a process for applying a profile to the inner surface of the cylinder bore. FIG. 2A depicts a pre-boring step in which an unprocessed cylinder bore inner surface 200 is bored to a diameter that is less than the diameter of the finished, e.g., honed, diameter of the inner surface. In some variations, the difference in diameter is 150 to 250 microns (μm). In other variations, the difference in diameter is 175 to 225 microns. In one variation, the difference in diameter is 200 microns.

Figure 2B:
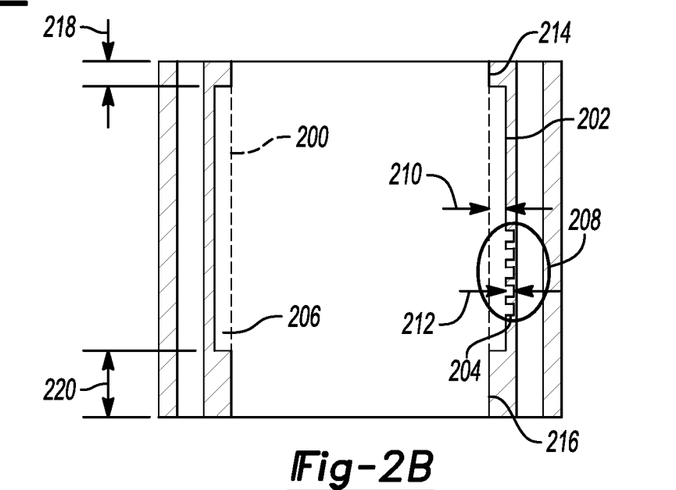
FIG. 2B illustrates an interpolating step in which a travel area is machined using a grooving tool to produce a recessed inner surface with a pocket and annular surface grooves.

Referring to FIG. 2B, an interpolating step in which a travel area 202 is machined into the pre-bored inner surface 200 using a grooving tool, is illustrated. Interpolation-based roughening can be accomplished with a grooving tool suitable for cylinder bores of varying diameter. The grooving tool can be used to roughen only a selected area of the bore, such as the ring travel area of the bore. Roughening only the ring travel portion of the bore may reduce coating cycle time, material consumption, honing time and overspray of the crank case.

The length of the travel area corresponds to the distance in which a piston travels within the engine bore. In some variations, the length of travel area 202 is 90 to 150 millimeters. In one variation, the length of travel area 202 is 117 millimeters. The travel area surface is manufactured to resist wear caused by piston travel. The grooving tool forms annular grooves 204 (as shown in magnified area 208 of FIG. 2B) and a pocket 206 into the travel area 202. It should be understood that the number of grooves shown in magnified area 230 are simply exemplary. Dimension 210 shows the depth of pocket 206. Dimension 212 shows the depth of annular grooves 204. In some variations, the groove depth is 100 to 140 microns. In another variation, the groove depth is 120 microns. In some variations, the pocket depth is 200 to 300 microns. In another variation, the pocket depth is 250 microns.

The pre-bored inner surface 200 also includes non-travel portions 214 and 216. These areas are outside the axial travel distance of the piston. Dimensions 218 and 220 show the length of non-travel portions 214 and 216. In some variations, the length of non-travel area 214 is 2 to 7 millimeters. In one variation, the length of non-travel area 214 is 3.5 millimeters. In some variations, the length of non-travel area 216 is 5 to 25 millimeters. In one variation, the length of non-travel area 216 is 17 millimeters. The grooving tool and the interpolating step are described in greater detail below.

Figure 2C:
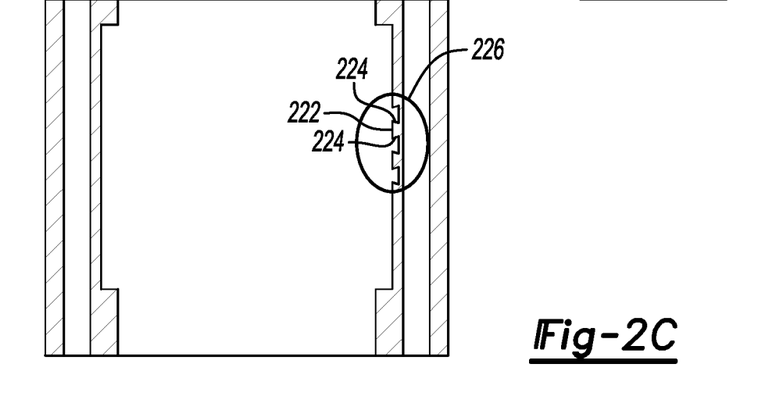
FIG. 2C illustrates a deforming step in which flat peaks between adjacent grooves are deformed to obtain deformed peaks.

Referring to FIG. 2C, the cylinder liner, after completing a deforming or peening step, is illustrated. The flat peaks between adjacent grooves 204 are deformed to obtain deformed peaks 222 in which each peak 222 includes a pair of undercuts 224, as shown in magnified area 226 of FIG. 2C. It should be understood that the number of deformed peaks shown in magnified area 226 are simply exemplary. The peening step may be carried out by rotating the grooving tool 300 in a rotational direction opposite the rotational direction used when cutting the pocket and the groove portions of the cylinder wall. The peening surface 312 (FIG. 3A-3E & FIG. 6A-6E) applies a force as the grooving tool 300 rotates in the opposite direction.

Figure 2D:
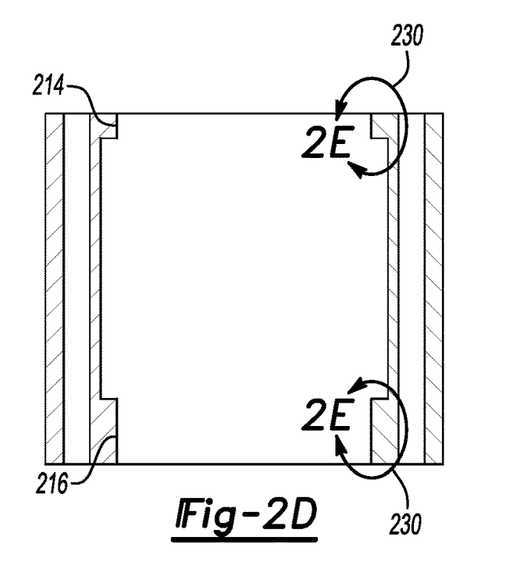
FIG. 2D illustrates an interpolating step in which one or more of the non-travel areas are machined using a grooving tool to form annular grooves.
Figure 2E:
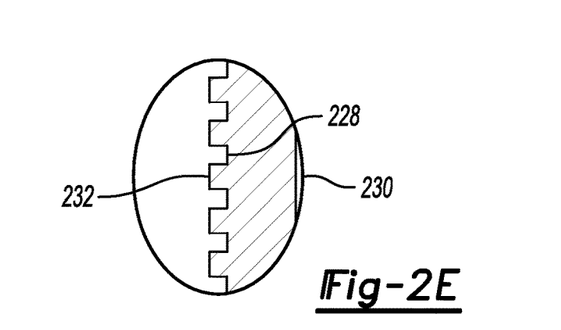
FIG. 2E is a magnified, schematic view of annular grooves formed in the non-travel areas of an engine bore.

Referring to FIG. 2D, an interpolating step in which one or more of the non-travel areas 214 and 216 are machined is illustrated. The interpolating step includes using a grooving tool to form annular grooves 228, as shown in magnified area 230 of FIG. 2E. Flat peaks 232 extend between annular grooves 228. It should be understood that the number of grooves shown in magnified area 230 are simply exemplary. In one embodiment, the grooves form a square wave shape of a uniform dimension. In some variations, the dimension is 25 to 100 microns. In one variation, the dimension is 50 microns. As described in greater detail below, the grooving tool may form a profile of grooves within one or more of the non-travel areas 214 and 216.

Figure 3A:
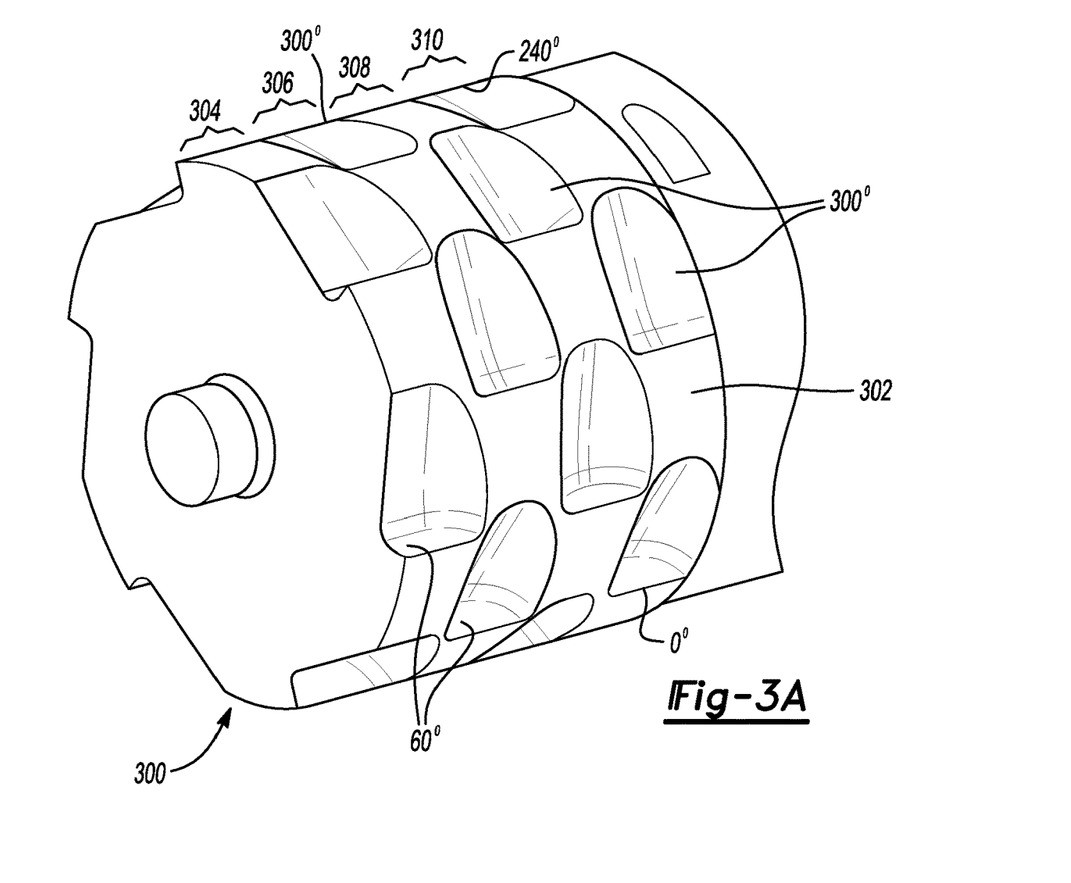
FIG. 3A is a perspective view of a grooving tool according to one embodiment.

Referring to FIG. 3A, a perspective view of a grooving tool 300 according to one embodiment is illustrated. Grooving tool 300 includes a cylindrical body 302 and first, second, third and fourth axial rows 304, 306, 308 and 310 of cutting elements. Cylindrical body 302 may be formed of steel or cemented tungsten carbide. The cutting elements may be formed of a grooving tool material suitable for machining aluminum or magnesium alloy. The considerations for selecting such materials include without limitation chemical compatibility and/or hardness. Non-limiting examples of such materials include, without limitation, high speed steel, sintered tungsten carbide or polycrystalline diamond. For economic reasons, tungsten carbide may be preferable over polycrystalline diamond. Each axial row 304, 306, 308 and 310 includes 6 cutting elements. The cutting elements are preferably detachable inserts attached by fastening means. Fastening means may include a threaded screw, bolt, stud, a high strength adhesive or braze. As shown in FIG. 3A, the six cutting elements are equally radially spaced apart from adjacent cutting elements. In other words, the six cutting elements are located at 0, 60, 120, 180, 240, and 300 degrees around the circumference of the cylindrical body 302. While six cutting elements are shown in FIG. 3A, any number of cutting elements may be used according to one or more embodiments. In certain variations, 2 to 24 cutting elements are utilized.

Figure 3B:
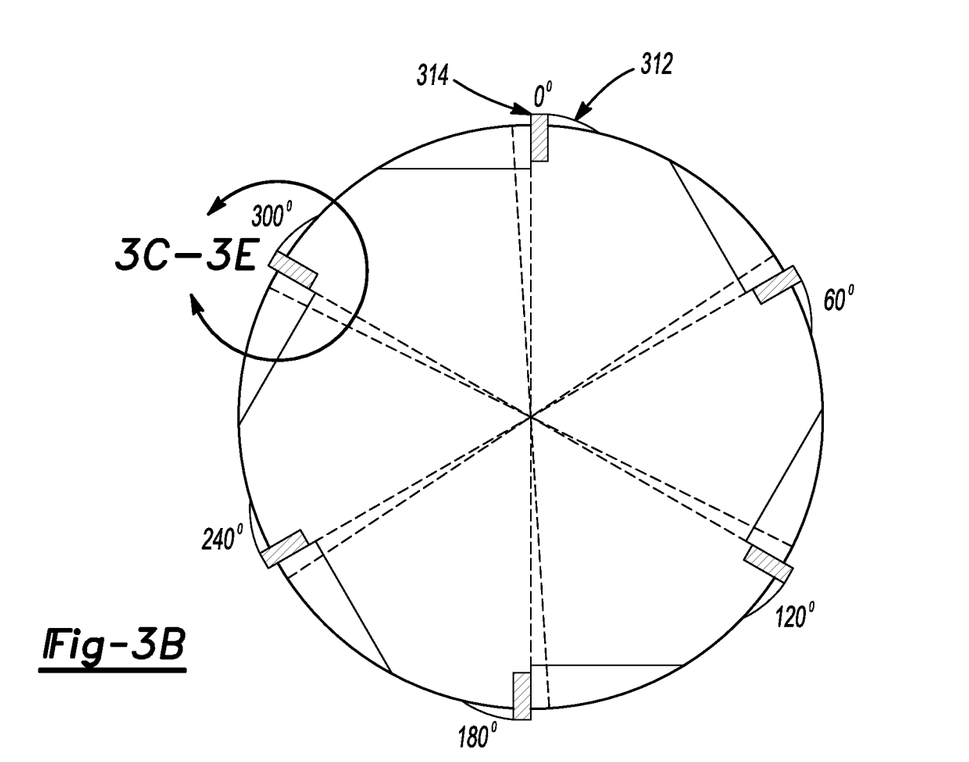
FIG. 3B is a top view of grooving tool showing a top axial row of cutting elements.

Referring to FIG. 3B, a top view of the grooving tool 300 is illustrated. The first axial row 304 of cutting elements is shown as disposed around the circumference of the cylindrical body 302 (FIG. 3A). As shown in FIG. 3B, the 0 degree cutting elements include a cutting surface 314 and peening surface or deforming surface 312. The other degree cutting elements include similar cutting and peening surfaces. In the embodiment shown, each of the cutting elements is one of three types of cutting elements, i.e., a first type of groove cutting element (G1), a second type of groove cutting element (G2) and a pocket cutting element (P). In the embodiment shown in FIG. 3B, the 60 and 240 degree cutting elements are the first type of groove cutting element; the 120 and 300 degree cutting elements are the second type of groove cutting element; and the 0 and 180 degree cutting elements are the pocket cutting element. Accordingly, the sequence of cutting elements from 0 to 300 degrees is G1, G2, P, G1, G2 and P, as shown in FIG. 3B. But any sequence of cutting elements is within the scope of one or more embodiments. In some variations, the sequence is G1, P, G2, G1, P and G2 or P, G1, G1, P, G2, and G2. In the embodiment shown, two groove cutting elements are necessary due to the width and number of valleys between peaks, which exceed the number and widths which can be cut with one element. For other groove geometries, one or three groove cutting elements may be used.

Figure 3C:
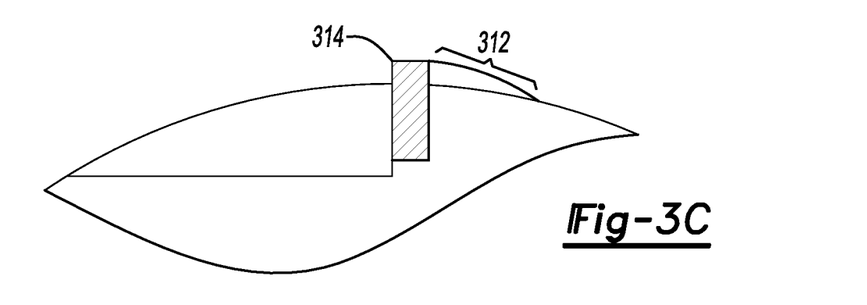
FIGS. 3C, 3D and 3E are detail views of cutting elements each having a different peening face.
Figure 3D:
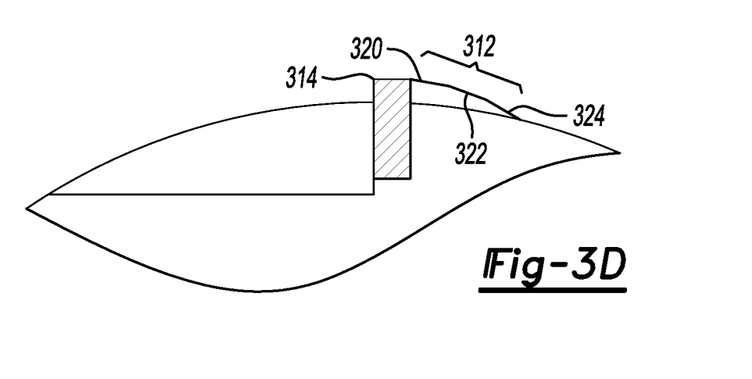
Figure 3E:
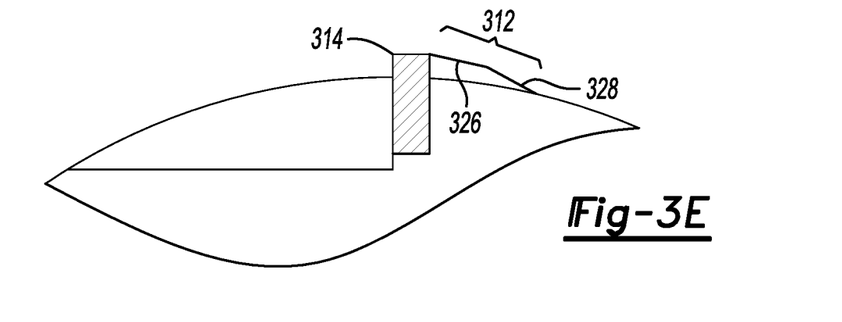

FIGS. 3C-3E illustrate a detailed view of one of the cutting elements in the first axial row 304 according to one or more embodiments. is shown in FIG. 3C, peening surface 312 has a circumferentially convex shape with a substantially smooth transition between the cutting edge 314 and the body 302. A peening surface that defines a chamfer having three sections, 320, 322, and 324, respectively is illustrated in FIG. 3D. A peening surface comprised of two straight line sections 326 and 328, respectively is illustrated in FIG. 3E. The first section 326 of the peening surface may have a length between 0.5 mm and 15 mm and may extend from the cutting edge 14 to the second section 328. The second section 328 of the peening surface has a length between 0.5 mm and 25 mm that is smaller than the first section and downwardly extends from the first section 326.

In some variations, there is at least one of G1 and G2 and at least one of P. As shown in FIG. 3A, the cutting elements in each row are offset or staggered circumferentially from one another between each row, e.g., each cutting element of the 0, 60, 120, 180, 240 and 300 degree cutting elements is staggered by 60 degrees in adjacent rows. The staggering improves the lifetime of the grooving tool by smoothing out the initial cutting of the inner surface profile. If the cutting elements are aligned between adjacent rows, more force would be necessary to initiate the cutting operation, and may cause more wear on the cutting elements or deflection and vibration of the tool.

The machined surface after the pocket grooving step and the peening step has one or more advantages over other roughening processes. First, adhesion strength of the metal spray may be improved by using the peening step instead of other secondary processes, such as diamond knurling, roller burnishing. The adhesion strength was tested using a pull test. The adhesion strength may be in the range of 40 to 70 MPa. In other variations, the adhesion strength may be 50 to 60 MPa. Compared to the adhesion strength of a diamond knurling process, the adhesion strength of peening is at least 20% higher. Adhesion is independent of profile depth of the grooves after the first processing step. This may be advantageous for at least two reasons. The peening surface cuts relatively lower profile depths compared to conventional processes, such as diamond knurling, roller burnishing. In certain variations, the reduction in profile depth is 20 to 40%. This reduction in profile depth reduces the amount of metal spray material necessary to fill the profile while not compromising adhesion strength. Also, any variation in the depth of the grooves does not affect the adhesion strength, which makes the peening step more robust than conventional processes. The deforming process can be operated at much higher operational speeds than other processes, such as roller burnishing.

Figure 3F:
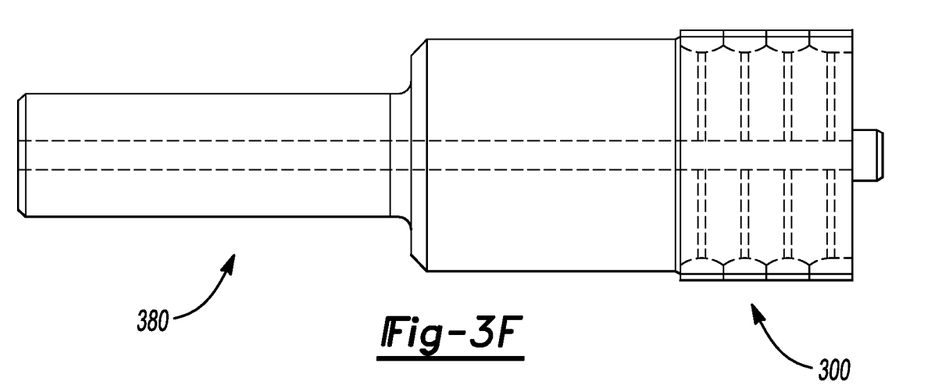
FIG. 3F is a plan view of a cylindrical shank for mounting a grooving tool in a tool holder according to one embodiment.

Referring to FIG. 3F, a cylindrical shank 380 for mounting grooving tool 300 is illustrated. In other embodiments, the shank may be replaced by a direct spindle connection, such as a CAT-V or HSK taper connection.

Figure 4A:
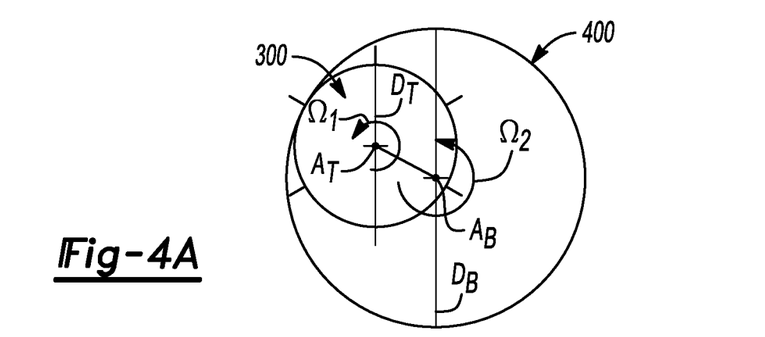
FIG. 4A is a schematic, top view of a cylinder bore according to one embodiment.

Referring to FIG. 4A, the movement of the grooving tool 300 within the cylinder bore 400 is illustrated. The grooving tool 300 is mounted in a machine tool spindle with an axis of rotation $A_T$ parallel to the cylinder bore axis $A_B$. The tool axis $A_T$ is offset from the bore axis $A_B$. The spindle is preferably a motorized spindle. The tool rotates in the spindle about its own axis $A_T$ at an angular speed $\Omega_1$ and precesses around the bore axis $A_B$ at angular speed $\Omega_2$. This precession is referred to as circular interpolation. The interpolating movement permits the formation of a pocket and annular, parallel grooves, and deforms material between and at the bottom of the grooves within the inner surface of a cylinder bore. Interpolate is a term used in the machining industry to define movement in two or more axes or planes between two points. Here, the machine moves in a circular interpolation (X-plane and Y-plane) and at an axial step in the vertical direction (Z-plane).

In one embodiment, the aspect ratio of the diameter of the grooving tool $D_T$ to the inner diameter of the bore $D_B$ is considered. In certain variations, the inner diameter is substantially greater than the grooving tool diameter. In certain variations, the grooving tool diameter is 40 to 60 millimeters. In certain variations, the inner diameter of the cylinder bore is 70 to 150 millimeters. Given this dimensional difference, this grooving tool may be utilized with a significant variation in bore diameter. In other words, use of the grooving tools of one or more embodiments does not require separate tooling for each bore diameter.

Regarding the interpolating step of FIG. 2D above, the grooving tool 300 is used to machine non-travel areas 214 and 216 to form annular grooves. In certain variations, the feed rate of the spindle during this step is 0.1 to 0.3 mm/rev. In another variation, the feed rate is 0.2 mm/rev. In certain variations, the rotational speed of grooving tool 300 is 3,000 to 10,000 rpms. In another variation, the rotational speed of a grooving tool is 6,000 rpms.

These non-travel areas do not require a subsequent metal spray. However, a torch for metal spraying typically stays on throughout the spray process. If these non-ring travel areas are not roughened, then spray metal that is inadvertently sprayed on these areas do not adhere, causing delamination. This delamination may fall into the bore during honing and become entrapped between the honing stones and bore walls, causing unacceptable scratching. The delamination may also fall into the crank case, which would then require removal. As such, by applying the annular grooves identified herein to the non-ring travel areas, thermal spray material adheres during the spray process and mitigates contamination of the intended spray surface and the crank case. The lightly sprayed non-ring travel areas may be easily removed during subsequent honing operation.

Figure 4B:
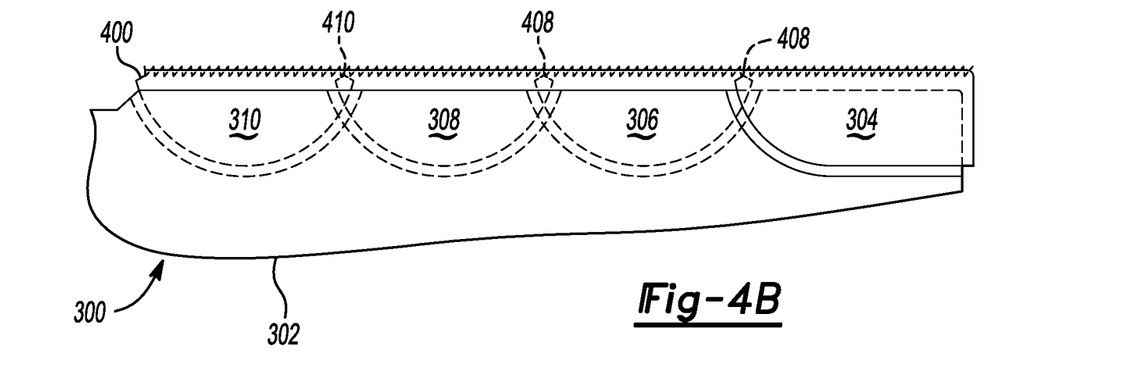
FIG. 4B is a schematic, side view of the cylinder bore of FIG. 4A according to one embodiment.

Referring to FIG. 4B, a fragmented portion of cylindrical body 302 of grooving tool 300 and cutting elements from axial rows 304, 306, 308 and 310 are schematically shown in an overlapping relationship. As described above and shown in this FIG. 4B, there are overlaps 406, 408 and 410 between adjacent cutting element rows. This overlap helps provide uniform and consistent profile cutting and peening in boundary regions.

Figure 5:
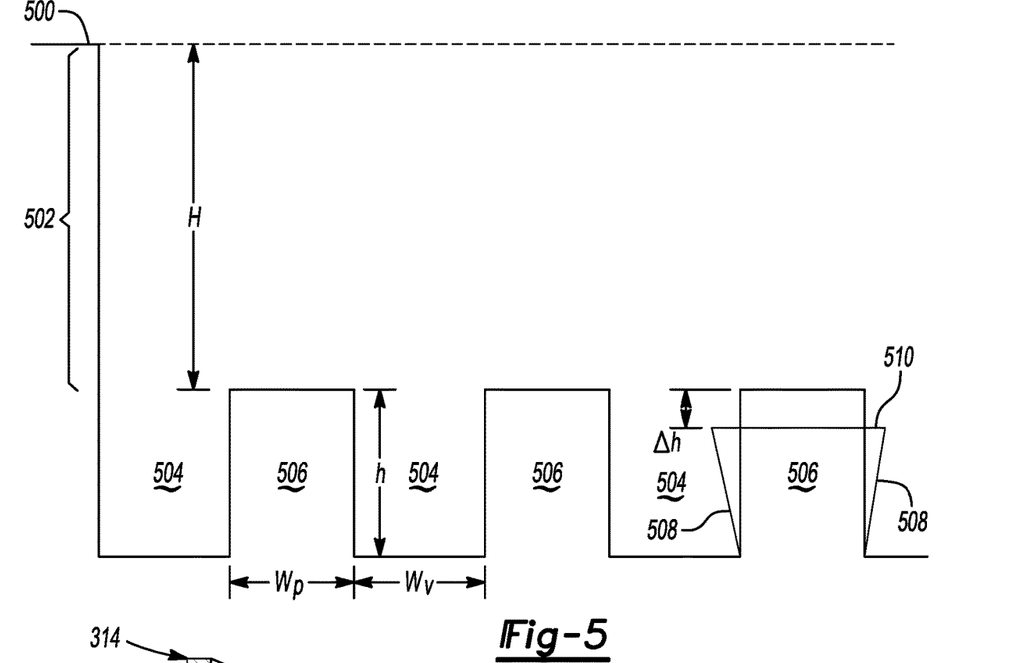
FIG. 5 is a diagrammatic illustration of the inner surface of the cylinder bore showing progression of the method claimed.

Referring to FIG. 5, a diagrammatic view of the inner surface 500 of the cylinder bore before, during and after the interpolating step is illustrated. The grooving tool 300 moves radially outward into the surface of the cylinder bore at a rate of 0.2 mm per revolution. As the grooving tool 300 moves into the inner surface, it is rotating at a speed of 6,000 rpms. The P pocket cutting elements cut pocket 502 into the inner surface 500. The height of the pocket is H. The H value corresponds to the axial offset between valleys of G1 and G2 cutting elements and the cutting surface of P cutting element. In one example, the offset is 250 microns. The $W_V$ value corresponds to the length of the tooth upper surfaces of the G1 and G2 cutting elements. In the same example, the tooth upper surfaces have a length of 250 microns. Therefore, $W_V$ is 250 microns.

The groove cutting elements G1 and G2 remove material 504 to create peaks 506. The height of the peaks is h and the width is $W_P$. In the specific example shown, $W_P$ is 150 microns. The h value is determined by the radial offset between the top groove cutting elements G1 and G2 and the pocket cutting element P.

Regarding the deforming step of FIG. 2C above, a grooving tool is rotated in a direction opposite to the rotational direction used for cutting grooves. The peening surface 312 is used to deform selective flat area peaks between grooves. As used herein, "Peening" is one form of deforming selective area and also may be referred to as "hammering".

Figure 6A:
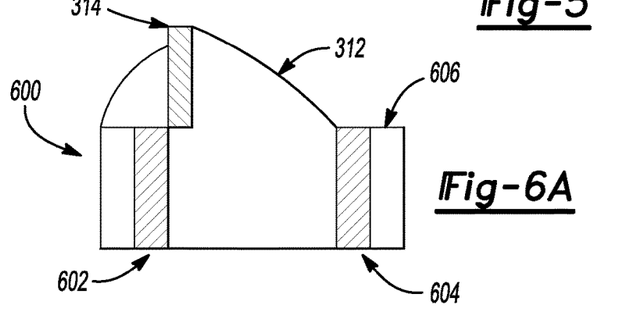
FIGS. 6A-C are detailed views of the cutting elements each having a different peening face according to one of the embodiments.
Figure 6B:
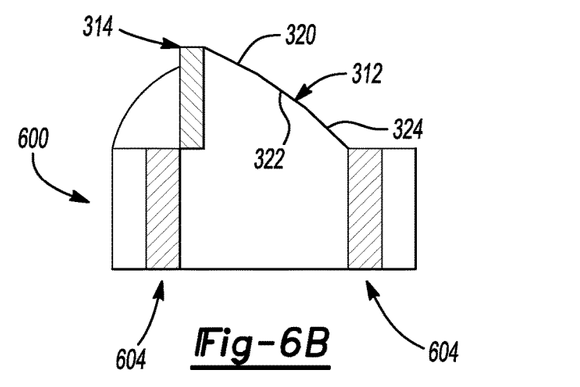
Figure 6C:
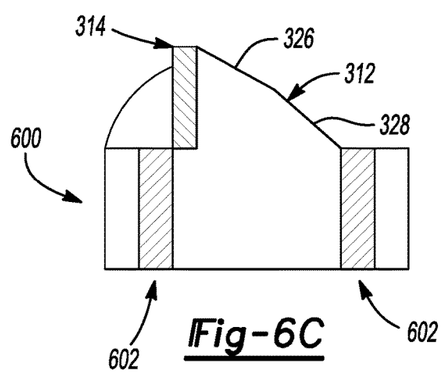
Figure 6D:
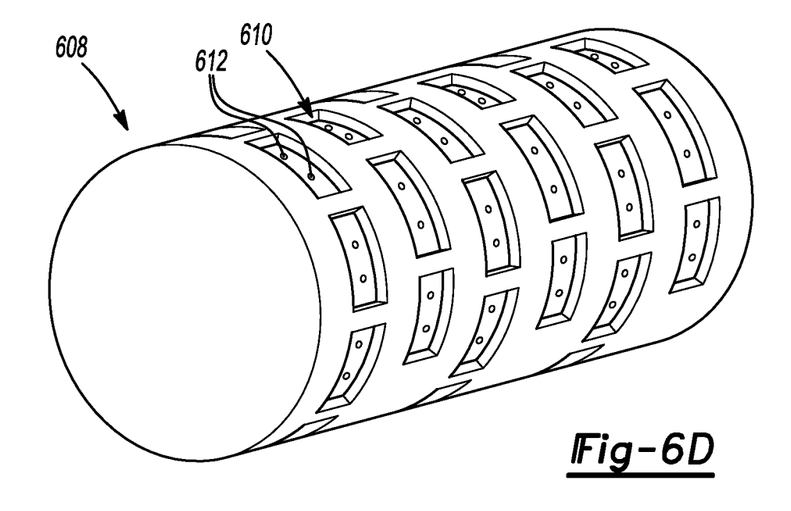
FIG. 6D is a perspective view of a body of the grooving tool.
Figure 6E:
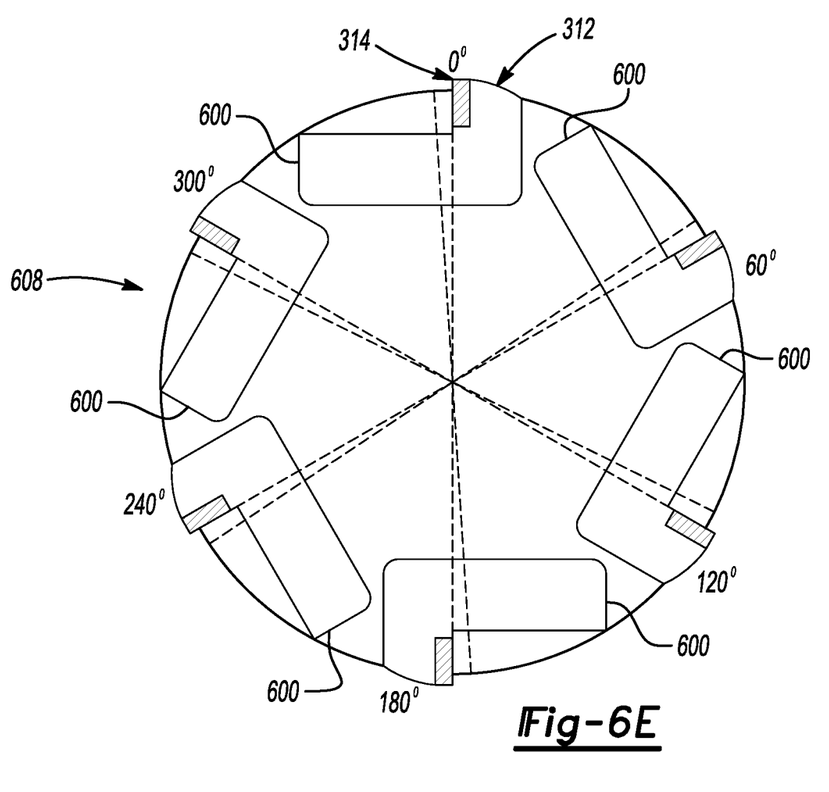
FIG. 6E is a top view of the grooving tool according to one of the embodiments.

FIGS. 6A-6C illustrates cutting inserts 600 with various peening surfaces 312. FIG. 6A illustrates a peening surface 312 with a circumferentially convex shape having a substantially smooth transition between the cutting edge 314 and the body 604 of the cutting insert 600. FIG. 6B illustrates a cutting insert 600 with a peening surface that is a chamfer having three sections, 320, 322, and 324, respectively. FIG. 6C illustrates a cutting insert 600 with a peening surface comprised of two straight line sections 326 and 328, respectively. The first section 326 of the peening surface has a length between 0.5 mm and 15 mm. The first section 326 extends from the cutting edge 314. The second section 328 of the peening surface has a length between 0.5 mm and 25 mm that is smaller than the first section and downwardly extends from the first section 326.

Referring to FIG. 6A, a detail view of the 0 degree cutting element and peening surface is illustrated. The peening surface 312 is circumferentially convex from the cylindrical body 302. The peening surface extends from the top portion of the cutting edge and extends to the cylindrical body 302. The peening surface may have the same diameter as the grooving tool, and the peening surface may have the same axial length as the cutting elements, so that the same tool path may be used to cut and deform the grooves to simplify the programming and reduce motion errors. Previously, deforming the grooves or peening the grooves was accomplished by using a separate swiper tool. The use of two tools requires additional production time to remove the grooving tool and install the swiper tool. Combining the features of the swiper tool within the grooving tool eliminates the additional changeover.

The peening surface may take various forms as described above. But the peening surface generally all define a surface that extends downwardly from the top of the cutting edge 314 to the cylindrical body 302 or the cutting insert 600. The peening surface is a relief surface that prevents heeling or rubbing during cutting or grooving operations. The relief surface allows material removed during the cutting or grooving operations to move away from the cutting edge 314.

The peening surface 312 does not cut into the inner surface of the cylinder bore. Instead, the peening tool 602 mechanically deforms grooves formed in the inner surface of the cylinder bore. The peening surface preferably includes a low friction coating applied by physical vapor deposition (PVD). Physical vapor deposition (PVD) describes a variety of vacuum deposition methods which can be used to produce thin films. PVD uses physical process (such as heating or sputtering) to produce a vapor of material, which is then deposited on the object which requires coating. Preferably the low-friction coating is titanium nitride but may include titanium diboride. Referring to FIG. 5, the peening surface creates undercuts 508 and elongates upper surface 510. As shown in FIG. 5, the difference between h (the height of the non-deformed peak) and the height of the deformed peak is Δh. In one variation, Δh is 10 microns, although it may be 5 to 60 microns. The undercuts increase the adhesion of a thermal spray coating onto the roughened inner surface of the cylinder bore. For the toolpath of the peening surface, the tool is offset one half wavelength of the roughening profile axially, and runs with reverse spindle rotation over a circular tool path with diameter 2Δh larger than the diameter used for the grooving step.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A grooving tool comprising:
   a body defining a plurality of recesses; and
   plural inserts each assembled into one of the recesses, the inserts including a cutting edge for forming grooves in an engine cylinder wall when rotated in one rotational direction and a peening surface extending in an opposite rotational direction from the cutting edge for deforming an upper edge of the grooves when rotated in the opposite rotational direction.

2. The grooving tool of claim 1, wherein the peening surface is comprised of a first straight-line section having a first length extending from and adjacent to the cutting edge and a second straight-line section downwardly extending between the first section and the body having a second length longer than the first straight line section.

3. The grooving tool of claim 1, wherein the peening surface is a chamfer comprised of three sections, a first section perpendicular to the cutting edge, a second section spaced apart from the cutting edge and perpendicular to the body and a third section disposed therebetween.

4. The grooving tool of claim 3, wherein the chamfer of the peening surface has a nonzero axial helix to reduce tool deflection.

5. The grooving tool of claim 1, wherein the peening surface has a coating having a lower coefficient of friction than a coefficient of friction of the cutting edge.

6. The grooving tool of claim 1, wherein the inserts are attached to the body by fasteners.

7. The grooving tool of claim 1, wherein the inserts are attached to the body by a brazed bond.

8. The grooving tool of claim 1, wherein the peening surface has a first coefficient of friction and the cutting edge has a second coefficient of friction that is higher than the coefficient of the peening surface.

* * * * *